(12) United States Patent
Segawa

(10) Patent No.: US 10,068,159 B2
(45) Date of Patent: Sep. 4, 2018

(54) DATA PROCESSING APPARATUS, IMAGE RECORDING SYSTEM, DATA PROCESSING METHOD, AND RECORDING MEDIUM

(71) Applicant: SCREEN HOLDINGS CO., LTD., Kyoto (JP)

(72) Inventor: Hiroyuki Segawa, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 14/800,553

(22) Filed: Jul. 15, 2015

(65) Prior Publication Data

US 2016/0019445 A1 Jan. 21, 2016

(30) Foreign Application Priority Data

Jul. 16, 2014 (JP) .................. 2014-146048

(51) Int. Cl.
*G06F 15/00* (2006.01)
*G06K 1/00* (2006.01)
*G06K 15/02* (2006.01)

(52) U.S. Cl.
CPC ..... *G06K 15/1836* (2013.01); *G06K 15/1825* (2013.01); *G06K 15/1852* (2013.01)

(58) Field of Classification Search
CPC ................................................. G06K 15/1836
See application file for complete search history.

(56) References Cited

U.S. PATENT DOCUMENTS

| | | | | |
|---|---|---|---|---|
| 2004/0080769 A1* | 4/2004 | Kodama | .................. | G06T 1/00 358/1.13 |
| 2004/0081371 A1 | 4/2004 | Nishide et al. | | |
| 2005/0099642 A1 | 5/2005 | Segawa et al. | | |
| 2008/0247642 A1* | 10/2008 | Eguchi | ................. | H04N 1/4052 382/167 |
| 2012/0223982 A1 | 9/2012 | Kondo et al. | | |
| 2014/0078525 A1 | 3/2014 | Hara et al. | | |

FOREIGN PATENT DOCUMENTS

| | | |
|---|---|---|
| JP | 8-77348 A | 3/1996 |
| JP | 2004-153331 A | 5/2004 |
| JP | 2005-167970 A | 6/2005 |
| JP | 2006-123371 A | 5/2006 |
| JP | 2008-259101 A | 10/2008 |
| JP | 2012-179852 A | 9/2012 |
| JP | 2014-060593 A | 4/2014 |

\* cited by examiner

*Primary Examiner* — King Poon
*Assistant Examiner* — Michael Burleson
(74) *Attorney, Agent, or Firm* — McDermott Will & Emery LLP

(57) ABSTRACT

A black figure specification part of a data processing apparatus specifies a black figure from among a plurality of figures in original image data that represents each figure in a vector format. When the overprint attribute of the black figure is ON, a data processing part adds a new black figure whose overprint attribute is OFF and that indicates a figure central portion of the black figure excluding an outer edge portion of a predetermined width from the edge, to the original image data. When the black figure overlaps with another figure that includes a color other than black, the density of the other color in the area where the figure central portion and the other figure overlap each other is zero in raster data for image recording. This increases the darkness of color of the black figure and reduces the appearance of white streaks around the black figure.

13 Claims, 14 Drawing Sheets

241

FIG. 18
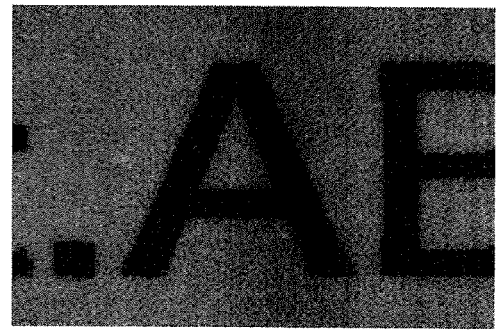
FIG. 19
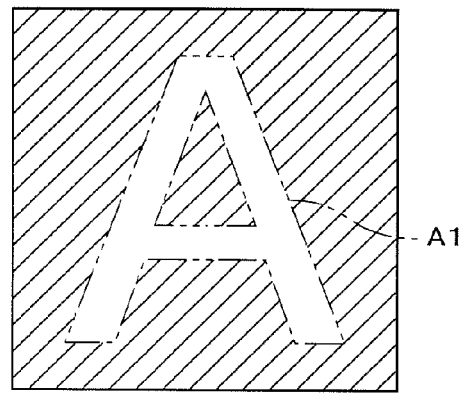
FIG. 20
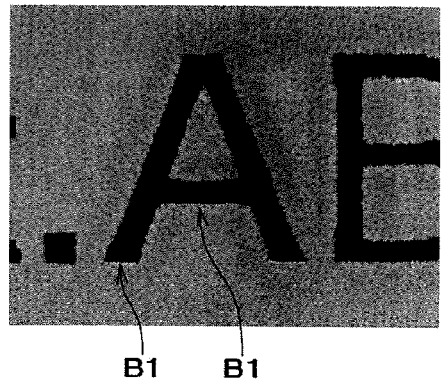
FIG. 21A
4pt.1234
3pt.　日本

FIG. 21B
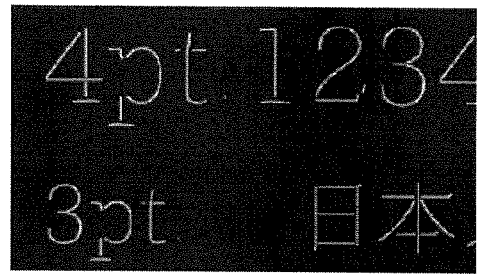
FIG. 22A
10pt.
FIG. 22B
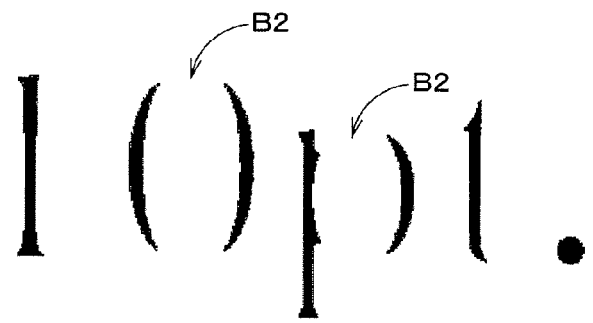
FIG. 22C
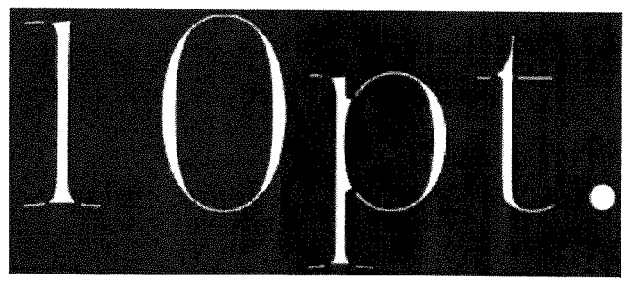

DATA PROCESSING APPARATUS, IMAGE RECORDING SYSTEM, DATA PROCESSING METHOD, AND RECORDING MEDIUM

TECHNICAL FIELD

The present invention relates to a technique for performing processing on original image data before the original image data is converted into raster data for image recording.

BACKGROUND ART

In printing using printing plates made with computer-to-plate (CTP) technology, overprinting is generally set for black characters (also referred to as "black ink characters"). In overprinting, when a black character overlaps with another figure that includes a color other than black, black ink is printed over ink of the other color in the area where the black character and the other figure overlap each other. This prevents white streaks from appearing around the black character during printing even if there is a slight shift in position relative to printing paper between a black printing plate and a printing plate of the other color. In printing using printing plates, black ink and the other color ink are superimposed one on another, so that black characters are represented in a darker tone (rich black) on printing paper.

Japanese Patent Application Laid-Open No. 2005-167970 discloses a technique in which, for example, when an overprint attribute of a figure in a portable document format (PDF) image file is "OP=false (knockout)," trapping is performed on the figure and a related lower-level figure. Thus, trapping is performed only when there is a risk of gaps appearing along the borders. Japanese Patent Application Laid-Open No. 2008-259101 discloses an image processor in which a received command group (image data) is interpreted to bitmap component images corresponding to a plurality of color materials, and attribute information included in the command group is used to generate attribute information of each pixel for each component image. Then, processing for changing the shape of objects is performed for each component image. For example, in the case where trapping is performed between a character portion of a cyan component image and a background portion of a magenta component image, the attributes of the trapped portions of the cyan component image and the magenta component image after the trapping are respectively a character attribute and a graphic attribute. Then, processing such as dithering is performed, using the attribute information and the image information for each component image. The above-described processing can improve image quality as compared with the case where each pixel at the same position has a common attribute for all component images.

Incidentally, when the overprint attribute of a black figure such as a black character is ON and the black figure overlaps with another figure that includes a color other than black in original image data before the original image is converted into raster data for image recording performed by an inkjet printer, black ink and the other color ink are ejected onto the area of printing paper where the black figure and the other figure overlap each other. If these inks are mixed in liquid form on the surface of the printing paper, the color of the black figure cannot be represented purely (i.e., the figure will be an impure black color) in the image recorded on the printing paper. It is conceivable to set the overprint attribute of each figure to OFF in the original image data, but if there is a shift in ink ejection positions between heads, white streaks will appear around the figure in the recorded image. In addition, the hues of figures other than black figures will be different from the intended hues.

SUMMARY OF INVENTION

The present invention is intended for a data processing apparatus for performing processing on original image data before the original image data is converted into raster data for image recording performed by an inkjet printer, and it is an object of the present invention to improve the quality of black figures in images recorded by the inkjet printer.

The data processing apparatus according to the present invention includes a black figure specification part for specifying a black figure from among a plurality of figures in original image data that represents each of the plurality of figures in a vector format, and a data processing part for performing processing on the original image data so that, when an overprint attribute of the black figure is ON and the black figure overlaps with another figure that includes another color other than black, a density of the another color in an area where a figure central portion of the black figure and the another figure overlap each other is lower than an original density of the another figure in raster data for image recording, the figure central portion being a portion excluding an outer edge portion that has a predetermined width from an edge of the black figure.

According to the present invention, it is possible to improve the quality of black figures in images recorded by the inkjet printer.

In a preferred embodiment of the present invention, the density of the another color in the area where the figure central portion and the another figure overlap each other is zero in the raster data. In this case, preferably, the data processing part updates the original image data by adding a new black figure that indicates the figure central portion and whose overprint attribute is OFF to the original image data.

In a preferable embodiment for the case of updating the original image data, the data processing part changes the overprint attribute of the black figure to ON when the overprint attribute of the black figure is OFF, and updates the original image data by adding a new black figure that indicates the figure central portion of the black figure and whose overprint attribute is OFF to the original image data.

In another preferable embodiment for the case of updating the original image data, the data processing apparatus further includes a composed figure generation part for generating a composed figure in which a thinned figure obtained by thinning one figure among the plurality of figures and at least part of a central line of the one figure are superimposed on each other, and replacing the one figure with the composed figure. The data processing part generates the new black figure from the composed figure when the composed figure is the black figure.

In yet another preferable embodiment for the case of updating the original image data, when a size of a black character serving as the black figure is less than or equal to a predetermined size, the new black figure includes at least part of a central line of the black character.

In another preferable embodiment of the present invention, the data processing part changes the overprint attribute of the black figure to OFF when the overprint attribute of the black figure is ON, and a trapping process is performed when the original image data in which the overprint attribute has been changed is converted into the raster data.

The present invention is also intended for an image recording system. The image recording system according to the present invention includes the above-described data processing apparatus, a RIP part for converting original image data processed by the data processing apparatus into raster data, and an inkjet printer for recording an image on a base material in accordance with the raster data.

In a preferable image recording system, in the inkjet printer, a plurality of color inks including black are sequentially ejected onto each position of the base material, and the plurality of color inks at the each position are simultaneously cured by a curing part.

The present invention is also intended for a data processing method for performing processing on original image data before the original image data is converted into raster data for image recording performed by an inkjet printer, and for a computer-readable recording medium that stores a program for causing a computer to perform processing on original image data before the original image data is converted into raster data for image recording performed by an inkjet printer.

These and other objects, features, aspects, and advantages of the present invention will become more apparent from the following detailed description of the present invention when taken into conjunction with the accompanying drawings.

BRIEF DESCRIPTION OF DRAWINGS

FIG. 18 illustrates a recorded image obtained by the comparative processing;

FIG. 19 illustrates another color image indicated by raster data according to the comparative processing;

FIG. 20 illustrates a recorded image obtained by the comparative processing;

FIG. 21A illustrates black characters;

FIG. 21B illustrates another color image indicated by raster data;

FIG. 22A illustrates black characters;

FIG. 22B illustrates an auxiliary black figure that is being generated;

FIG. 22C illustrates another color image indicated by raster data; and

DESCRIPTION OF EMBODIMENTS

Figure 1:
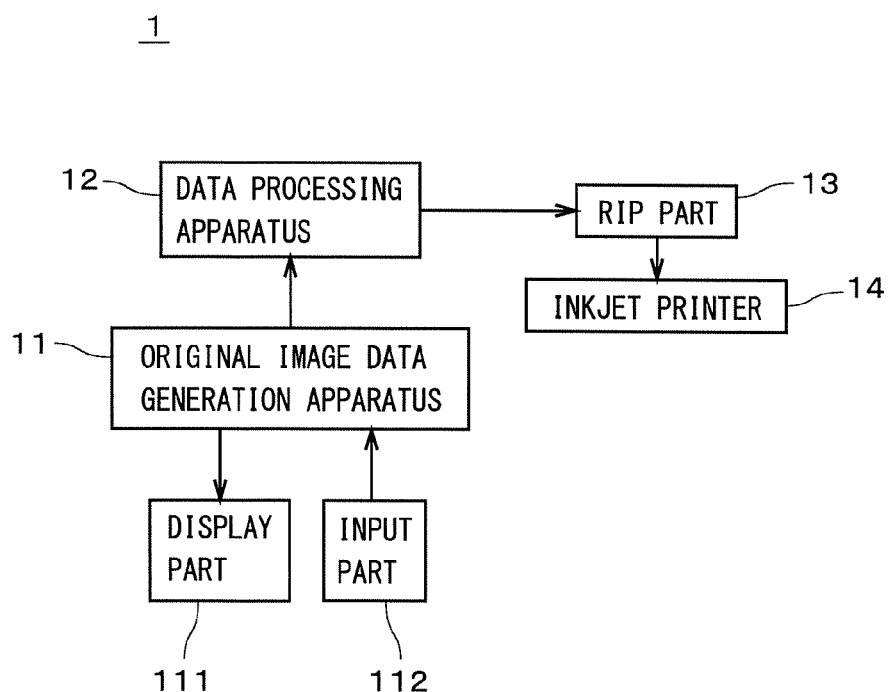
FIG. 1 illustrates a configuration of an image recording system.

FIG. 1 is a block diagram of a configuration of an image recording system 1 according to a first embodiment of the present invention. The image recording system 1 includes an original image data generation apparatus 11, a data processing apparatus 12, an RIP part 13, and an inkjet printer 14. The original image data generation apparatus 11 is connected to a display part 111 and an input part 112. The display part 111 and the input part 112 may be provided in various forms in the image recording system 1. For example, the display part 111 and the input part 112 may be part of the original image data generation apparatus 11, or may be part of the data processing apparatus 12 as will be described later.

The present embodiment describes an example of the case where the original image data generation apparatus 11 and the data processing apparatus 12 are implemented by a single computer, but the original image data generation apparatus 11, the data processing apparatus 12, and the RIP part 13 may be implemented in various forms. For example, all of the original image data generation apparatus 11, the data processing apparatus 12, and the RIP part 13 may be implemented by a single computer, or only the data processing apparatus 12 and the RIP part 13 may be implemented by a single computer. The RIP part 13 may be implemented by a computer of the inkjet printer 14. Similarly, the data processing apparatus 12 may be implemented by the computer of the inkjet printer 14.

The original image data generation apparatus 11 generates original image data, which will be described later, and the data processing apparatus 12 performs processing on the original image data to update the original image data. The RIP part 13 generates raster data for image recording from the original image data (updated original image data) that has undergone the processing performed by the data processing apparatus 12. The inkjet printer 14 records an image on a base material in accordance with the raster data.

Figure 2:
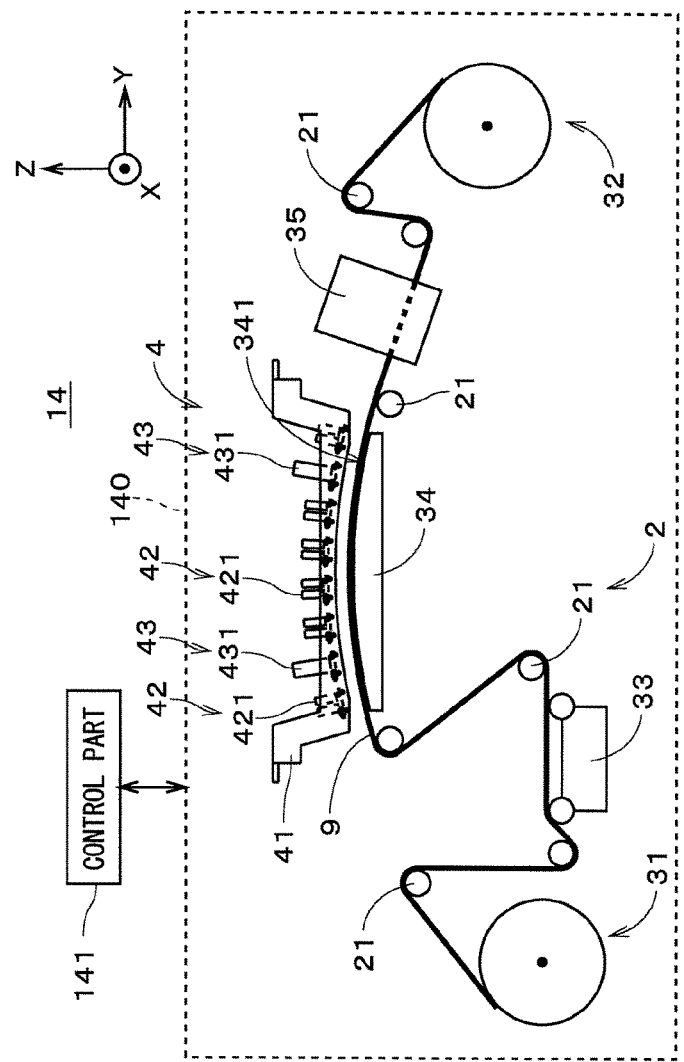
FIG. 2 illustrates a configuration of an inkjet printer.

FIG. 2 illustrates a configuration of the inkjet printer 14. The inkjet printer 14 is an apparatus for recording an image on a base material 9 in continuous sheet form, such as continuous form paper, by ejecting fine droplets of ink toward the base material 9. In the present embodiment, the base material 9 has ink repellency. The base material 9 may be a material other than paper, and it may, for example, be a plastic film. In FIG. 2, two horizontal directions perpendicular to each other are assumed to be X and Y directions, and a vertical direction perpendicular to the X and Y directions is assumed to be a Z direction. The X and Y directions are not necessarily always in the horizontal direction, and the Z direction is not necessarily always in the vertical direction.

The inkjet printer 14 includes a main body 140 and a control part 141. The main body 140 includes a scanning mechanism 2 for moving the base material 9, and a head unit 4 for ejecting fine droplets of UV curing ink toward the base material 9 that is being moved by the movement mechanism 2. The scanning mechanism 2 includes a plurality of rollers 21 that are each long in the X direction in FIG. 2. In the vicinity of the roller 21 that is disposed furthest to the −Y side is a supply part 31 that holds a roll (supply roll) of the base material 9. In the vicinity of the roller 21 that is disposed furthest to the +Y side is a taking-up part 32 that holds a roll (taken-up roll) of the base material 9. In the inkjet printer 14, some of the rollers 21 of the scanning mechanism 2 rotate at a constant rotational speed about an axis parallel to the X direction so that the base material 9 moves at a constant speed along a predetermined travel path from the supply part 31 to the taking-up part 32.

On the travel path of the base material 9, a guiding part 34 is provided at a position facing the head unit 4. The guiding part 34 has a curved surface 341 (hereinafter, referred to as a "guideway 341"), which is part of a cylindrical surface that is located immediately under the head unit 4 (on the −Z side) and is centered on a virtual axis parallel to the X direction. The base material 9 moves along the smooth guideway 341 under the head unit 4. The travel path of the base material 9 curves upward toward the head unit 4 at a position facing the head unit 4, and accordingly stretches the base material 9 along the guideway 341.

The travel path of the base material 9 is also provided with a skew correction part 33 for correcting skewing of the base material 9 between the supply part 31 and the guiding part 34, and a ultraviolet-ray emitting part 35 for emitting ultraviolet rays for curing ink between the guiding part 34 and the taking-up part 32. Note that the inkjet printer 14 may further include other constituent elements such as a pre-processing part for performing predetermined pre-processing on the base material 9.

The head unit 4 includes a plurality of head assemblies 42 having heads 421, a plurality of emitting assemblies 43 having emitting parts 431, and a base 41 that supports the head assemblies 42 and the emitting assemblies 43. The assemblies 42 and 43 are each long in the X direction and are arranged approximately in the Y direction (to be precise, in the scanning direction).

One head assembly 42 that ejects a white (W) ink is disposed furthest to the −Y side, and one emitting assembly 43 is disposed on the +Y side of this head assembly 42. On the +Y side of this emitting assembly 43 are four head assemblies 42 that respectively eject black (K), cyan (C), magenta (M), and yellow (Y) inks. On the +Y side of the four head assemblies 42 is one emitting assembly 43, and on the +Y side of this emitting assembly 43 is one head assembly 42 that ejects an ink of a predetermined specific color.

In the inkjet printer 14, the white ink is ejected onto each position of the base material 9 and precured with the light emitted from the emitting assembly 43. Next, the K, C, M, and Y inks are sequentially ejected onto that position and precured simultaneously with the light emitted from the emitting assembly 43 serving as a curing part. Then, the specific color ink is ejected onto this position, and the plurality of color inks ejected to that position are simultaneously cured by the ultraviolet-ray emitting part 35. The head unit 4 may also eject other types of ink, such as an invisible ink.

Figure 3:
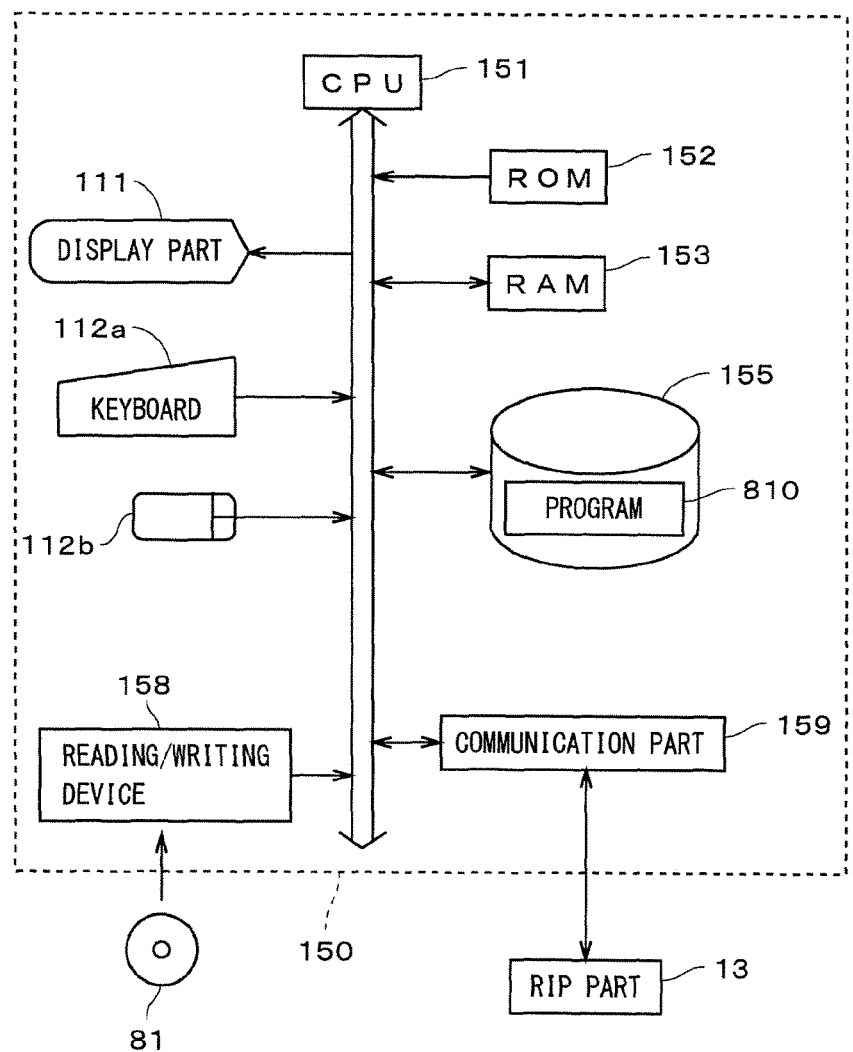
FIG. 3 illustrates a configuration of a computer.

FIG. 3 illustrates a configuration of a computer 150 that implements the original image data generation apparatus 11 and the data processing apparatus 12. The computer 150 has a configuration of a typical computer system that includes a CPU 151 that performs various types of computational processing, a ROM 152 that stores basic programs, and a RAM 153 that stores various types of information. The computer 150 further includes a fixed disk 155 that stores information, a display part 111 that displays various types of information, a keyboard 112a and a mouse 112b that serve as the input part 112 and receive input from an operator, a reading/writing device 158 that reads out or writes information from or to a computer-readable recording medium 81 such as an optical disk, a magnetic disk, or a magneto-optical disk, and a communication part 159 that communicates with the RIP part 13.

The computer 150 reads out a program 810 in advance from the recording medium 81 via the reading/writing device 158 and stores the program 810 in the fixed disk 155. Then, the CPU 151 executes computational processing in accordance with the program 810 (i.e., the computer executes the program) while using the RAM 153 and the fixed disk 155. This allows the computer 150 to function as the original image data generation apparatus 11 and the data processing apparatus 12.

Figure 4:
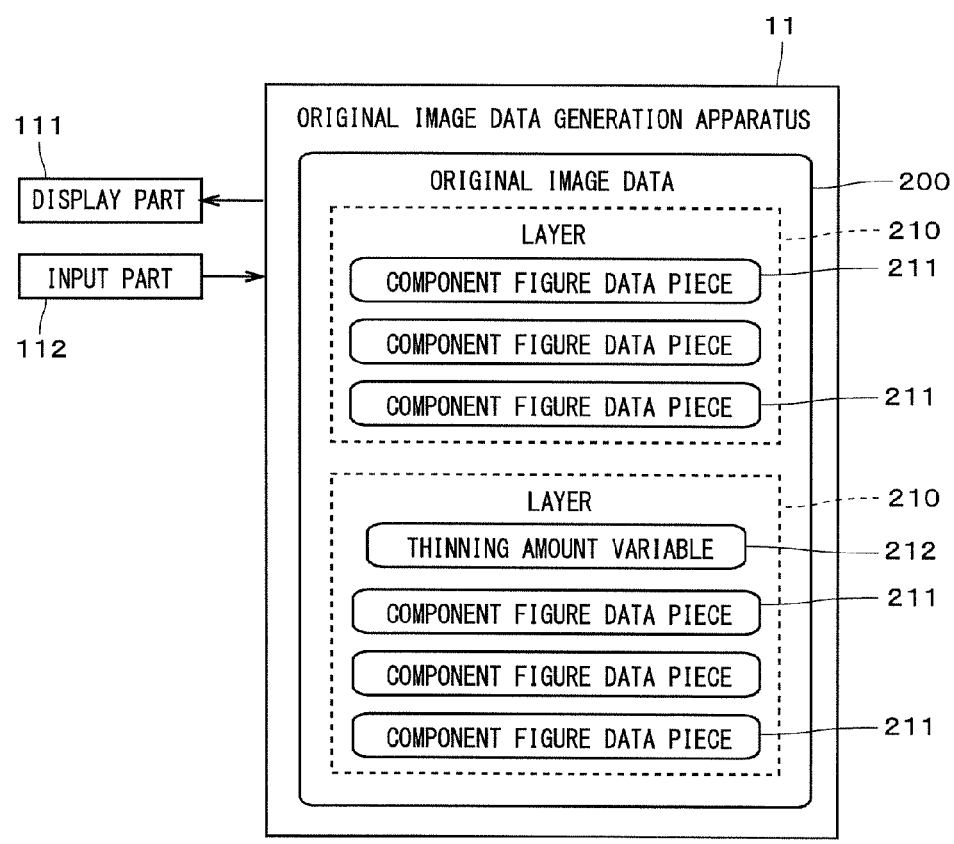
FIG. 4 illustrates an original image data generation apparatus and a structure of original image data.

FIG. 4 illustrates the original image data generation apparatus 11 and a structure of original image data 200 generated by the original image data generation apparatus 11. The original image data 200 is preferably written in a page description language. The original image data 200 is generated by a user of the original image data generation apparatus 11 operating the input part 112 while referring to display on the display part 111. For example, the computer executes Acrobat (Adobe Systems Incorporated, California, U.S.A) to generate the original image data 200 in a portable document format (PDF).

Figure 5:
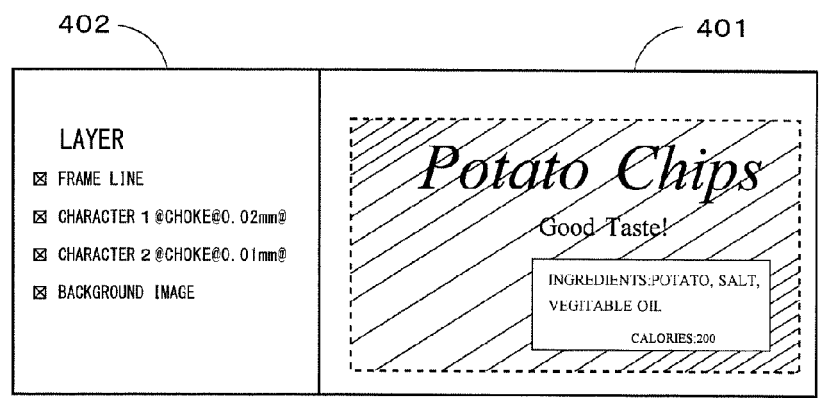
FIG. 5 illustrates an example of display on a display part.

The original image data 200 includes a plurality of layers 210. FIG. 4 illustrates only two of these layers 210. Each layer 210 includes object data corresponding to a plurality of objects, i.e., component figure data corresponding to a plurality of component figures. In the following description, a piece of component figure data that corresponds to a single component figure is expressed, as appropriate, as a single countable data piece, i.e., component figure data piece 211. Some layers 210 include a thinning amount variable 212, which will be described later. FIG. 5 illustrates an image to be printed on a product package as an example of display on the display part 111 in which pieces of information of a plurality of layers 210 are superimposed one above another. The display includes an editing area 401 and an information area 402. The editing area 401 displays an image indicated by at least one of the layers 210 for a user to reference. Alternatively, it is also possible to hide all of the layers 210.

The information area 402 displays a list of names of the layers 210. A name with a checked checkbox indicates that the layer 210 with this name is currently being displayed in the editing area 401. The letters "@CHOKE@0.02 mm@" following the name of the layer 210 indicates that the image indicated by this layer is to be thinned by 0.02 mm. This information corresponds to the thinning amount variable 212 in FIG. 4. The unit of the thinning amount can be appropriately changed to, for example, a point size corresponding to a character size, the number of pixels, or inches. In the present embodiment, information about thinning is associated with each layer 210.

Figure 6A:
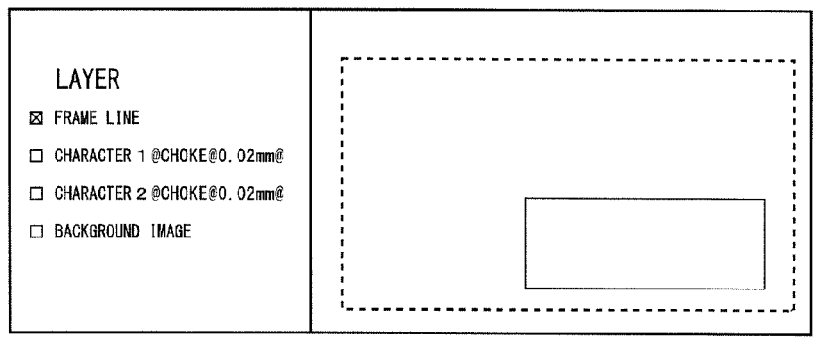
FIG. 6A illustrates an image of a layer.
Figure 6B:
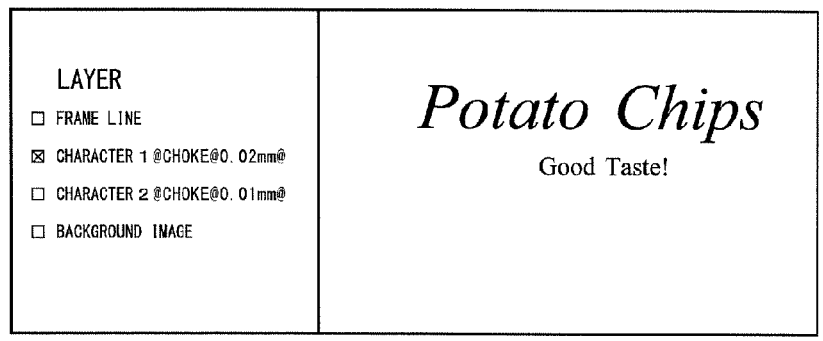
FIG. 6B illustrates an image of a layer.
Figure 6C:
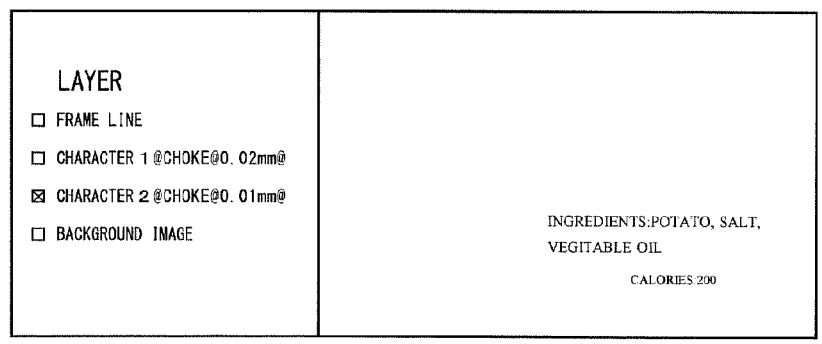
FIG. 6C illustrates an image of a layer.
Figure 6D:
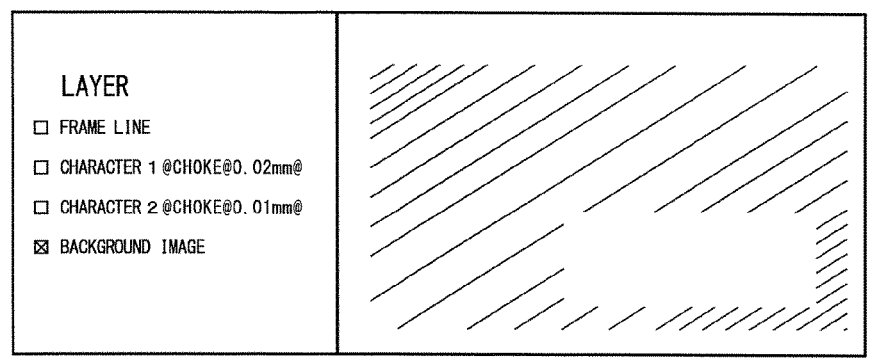
FIG. 6D illustrates an image of a layer.

FIGS. 6A to 6D illustrate images of the respective layers 210. FIG. 6A illustrates frame lines. FIG. 6B illustrates large characters. FIG. 6C illustrates small characters. FIG. 6D illustrates a background image. In the present embodiment, the background image is display of a single component figure data piece 211 and is raster data. Each character is display of a single component figure data piece 211. The characters are represented by vector data that indicates outlines. It is thus possible to record correct characters independently of the type of the inkjet printer 14. Each frame line is also display of a single component figure data piece 211 and is vector data.

FIGS. 6A to 6D are merely one example, and the background image may, for example, be display of a plurality of component figure data pieces 211, and some of the component figure data pieces 211 may include vector data. Similarly, some of the characters may be represented in a font expressed by a dot array.

Figure 7:
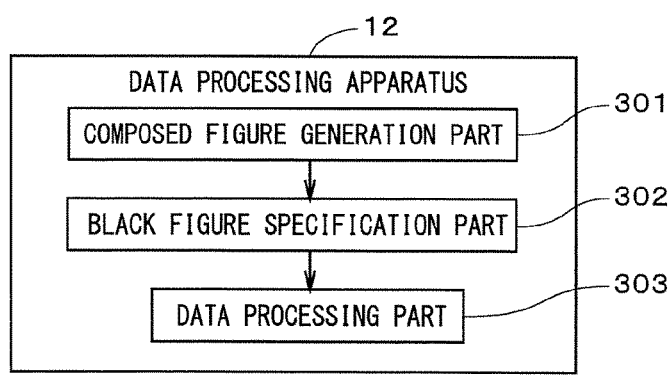
FIG. 7 illustrates a functional configuration of a data processing apparatus.

FIG. 7 illustrates a functional configuration of the data processing apparatus 12 that is implemented by the computer 150 executing the program 810. The data processing apparatus 12 includes a composed figure generation part 301, a black figure specification part 302, and a data processing part 303. In practice, the data processing apparatus 12 also includes a control part that controls a sequence of operations of these functions. The functions illustrated in FIG. 7 may be implemented by a dedicated electric circuit, or may be partly implemented by a dedicated electric circuit.

Figure 8A:
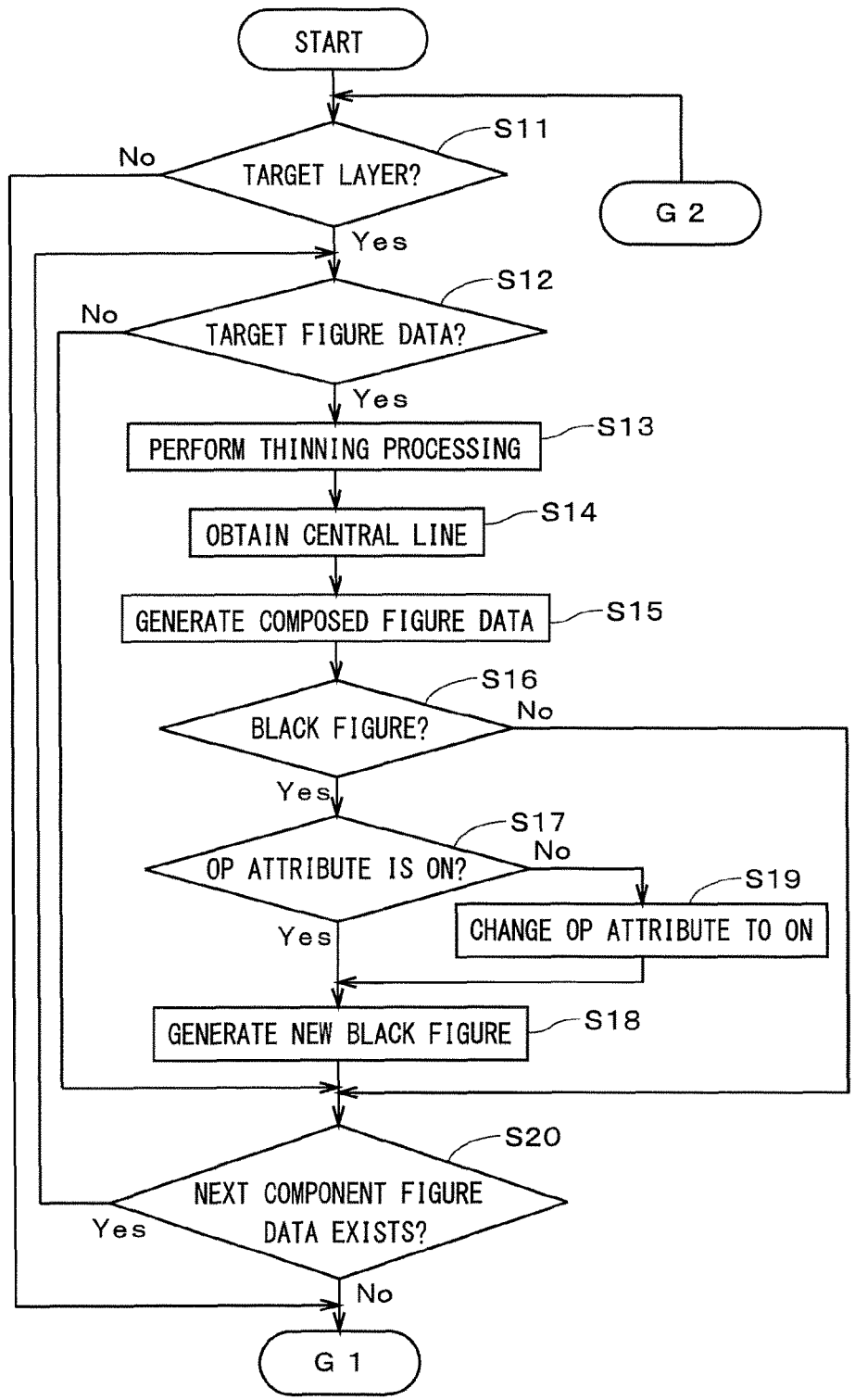
FIG. 8A is a flowchart of operations performed by the data processing apparatus.
Figure 8B:
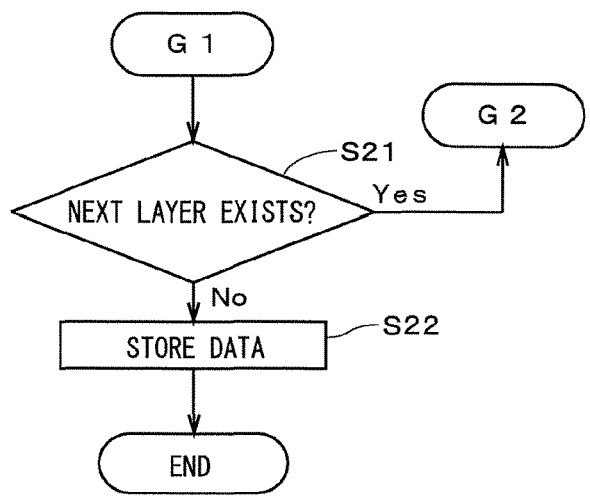
FIG. 8B is a flowchart of operations performed by the data processing apparatus.

FIGS. 8A and 8B are flowcharts of operations performed by the data processing apparatus 12. The data processing apparatus 12 performs processing on the original image data 200 before the original image data 200 is converted into raster data for image recording performed by the inkjet printer 14. Upon receiving input of information about the first layer 210 in the original image data 200, the data processing apparatus 12 checks whether or not the layer 210 is a layer to be processed. In the present embodiment, a layer with a name including "@CHOKE@" is assumed to be a layer to be processed. In the example in FIG. 5, the first "frame line" layer 210 where component figure data pieces 211 include vector data that indicates polygonal lines is not a layer to be processed (step S11), and the data processing apparatus 12 confirms the presence of the next "Character 1" layer 210 (step S21) and checks whether or not this layer 210 is a layer to be processed.

Since the "Character 1" layer 210 is a layer to be processed (step S11), the data processing apparatus 12 checks whether or not the first component figure data piece 211 of this layer 210 is data to be processed. In the present embodiment, all component figure data pieces 211 that belong to the "Character 1" layer 210 include vector data and are determined as data to be processed (step S12). Such component figure data pieces 211 that include vector data also include information such as whether or not to fill in the figure, the color used to fill in the figure (here, the densities of C, M, Y, and K), a hierarchical relationship with other figures, and an overprint attribute, which will be described later. Hereinafter, a component figure data piece 211 that is to be processed is referred to as a "target figure data piece 211." Examples of component figure data pieces 211 that are not to be processed include polygonal lines (strokes), gradation graphics, and font characters.

Figure 9:
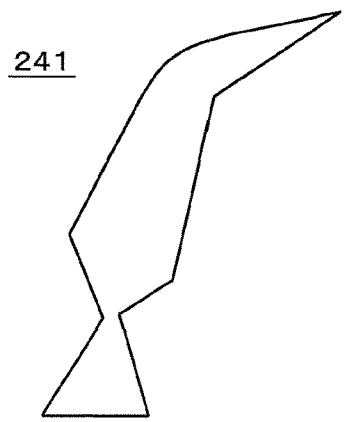
FIG. 9 shows an example of a target figure.
Figure 10A:
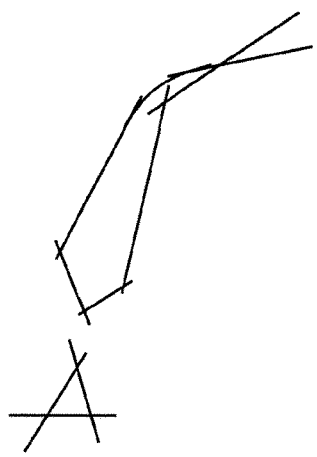
FIG. 10A illustrates thinning processing.
Figure 10B:
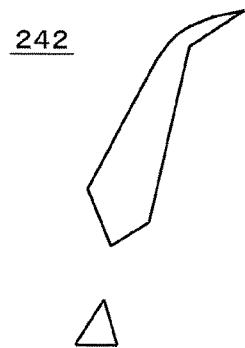
FIG. 10B illustrates a thinned figure.

The target figure data piece 211 is first subjected to thinning processing performed by the composed figure generation part 301 (step S13). The target figure data pieces 211 that belong to the "Character 1" layer 210 are subjected to thinning processing using a thinning amount of 0.02 mm. FIG. 9 illustrates an example of a target FIG. 241 that is not limited to a character, as a figure indicated by a target figure data piece 211. The thinning processing involves moving each line segment of the target FIG. 241 inward by the thinning amount as illustrated in FIG. 10A. Line segments that are isolated from others are appropriately extended to keep intersecting with others, and lines that extend off the edges of closed areas are deleted. This produces a thinned FIG. 242 illustrated in FIG. 10B.

Figure 11A:
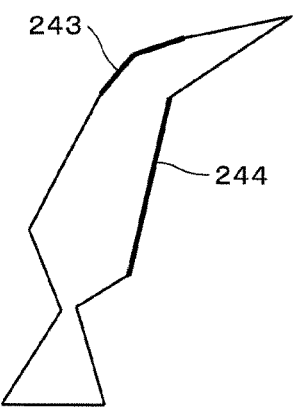
FIG. 11A illustrates a target figure in the process of acquiring a central line.
Figure 11B:
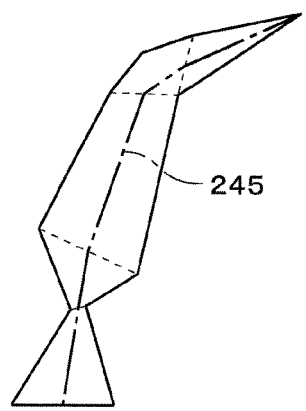
FIG. 11B illustrates the central line.

Next, vector data that indicates a central line of the target FIG. 241 is acquired (step S14). The acquisition of the central line first involves approximating each curve to a polygonal line 243 as illustrated in FIG. 11A. If a plurality of line segments represent a single line segment by overlapping one another or by being aligned in a line, these line segments are integrated into a single line segment 244. Next, lines segments that are opposed to each other in long line segments are searched for to acquire a plurality of line segment pairs, each consisting of line segments opposed to each other. Then, a polygonal line that passes through the centers of these line segment pairs is acquired as a central line 245 as illustrated in FIG. 11B. Note that the actual process of acquiring the central line involves referencing the amount of thinning in the thinning processing to determine the position at which the central line is generated.

Figure 12:
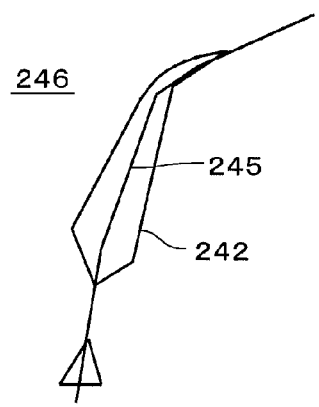
FIG. 12 illustrates a composed figure.

The thinning processing (step S13) and the acquisition of the central line (step S14) may be performed in the reverse order, or may be performed in parallel. The composed figure generation part 301 generates a composed figure data piece that indicates an instruction to record a composed FIG. 246 in FIG. 12 in which the thinned FIG. 242 and the central line 245 are superimposed on each other (step S15). The target figure data piece 211 is replaced by the composed figure data piece that includes vector data. In other words, information indicating the shape of the target FIG. 241 in the target figure data piece 211 is replaced by information indicating the shape of the composed FIG. 246.

Then, the black figure specification part 302 checks the color of the composed FIG. 246 indicated by the composed figure data piece. If the density of black in the composed FIG. 246 as a whole is 100% (maximum density) and the densities of the other colors (here, C, M, and Y) are 0%, the composed FIG. 246 is specified as a black figure (step S16). The black figure is a figure that is filled in with black as a whole. In actuality, the color of the composed FIG. 246 is the same as the color of the target FIG. 241 indicated by the target figure data piece 211. Alternatively, the black figure may be a figure in which the density of black is in the range of 90 to 100% and the densities of all the other colors is substantially 0%.

If the composed FIG. 246 is specified as a black figure, the data processing part 303 checks whether or not the overprint attribute (OP attribute) of this black figure is ON. The overprint attribute used here refers to a parameter that determines, when there is another figure arranged under the black figure, what color to use in raster data for image recording to represent an area where the two figures overlap each other. When the overprint attribute is ON, the above area is represented in a combination color in the raster data, the combination color being obtained by combining the colors of the two figures using a predetermined method. When the overprint attribute is OFF, the above area is represented in only the color of the figure arranged above in the raster data. When the overprint attribute of the black figure is ON (step S17), a new black figure (hereinafter, referred to as an "auxiliary black figure") is generated (step S18). Note that the overprint attribute of the composed FIG. 246 is the same as that of the target FIG. 241 indicated by the target figure data piece 211.

Figure 13:
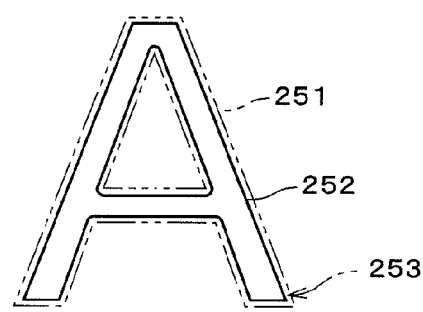
FIG. 13 illustrates an auxiliary black figure.

FIG. 13 illustrates an auxiliary black FIG. 252. In FIG. 13, the auxiliary black FIG. 252 is indicated by the solid line, and a black FIG. 251 is indicated by the dashed double-dotted line. The data processing part 303 generates the auxiliary black FIG. 252 by performing processing similar to the thinning processing performed by the composed figure generation part 301, on the black FIG. 251. Here, the thinning processing using a thinning amount of 0.06 mm is performed. The thinning amount used in step S18 is set independently of the thinning amount used to generate the thinned FIG. 242 and is thus referred to as a "thinning amount for black figures" in the following description. The thinning amount for black figures is variable and can be set arbitrarily by an operator.

Assuming that a portion of the black FIG. 251 excluding an outer edge portion 253 that has a width of the thinning amount for black figures from the edge of the black FIG. 251 is a figure central portion, the auxiliary black FIG. 252 is a figure that indicates only the figure central portion. The data processing part 303 adds an auxiliary black figure data piece that indicates the auxiliary black FIG. 252 whose overprint attribute is OFF and that is located over the black FIG. 251 to the original image data 200.

On the other hand, if the overprint attribute of the black figure specified in step S16 is OFF (step S17), the overprint attribute of this black figure is changed to ON (step S19). Then, step S18 is performed in the same manner as described above. Specifically, an auxiliary black figure that indicates the figure central portion of the black figure and whose overprint attribute is OFF is generated, and an auxiliary black figure data piece is added to the original image data 200.

When the processing has been completed for the single target figure data piece 211, the presence or absence of the next component figure data piece 211 in the layer 210 is checked as illustrated in FIG. 8A, and if there is the next component figure data piece (step S20), the procedure returns to step S12 to check whether or not this component figure data piece 211 is a target figure data piece 211. In the present embodiment, steps S13 to S15 are performed for all component figure data pieces 211 of the "Character 1" layer 210, and target figure data pieces 211 are replaced by composed figure data pieces. Moreover, steps S17 to S19 are performed if composed figures indicated by composed figure data pieces are black figures, and steps S17 to S19 are not performed if the composed figures are not black figures (step S16).

When the processing has been completed for the "Character 1" layer 210 (i.e., if there is no more component figure data piece 211 in the layer 210) (step S20), the procedure proceeds to processing for a "Character 2" layer 210 (step S21). All component figure data pieces 211 that belong to the "Character 2" layer 210 are also target figure data pieces 211 and are thus processed in the same manner as those of the "Character 1" layer 210. The next "background image" layer 210 is not a layer to be processed. Thus, steps S13 to S19 are not performed.

Through the above processing, the target figure data pieces 211 in the original image data 200 are replaced by composed figure data pieces, and when the composed figures are black figures, auxiliary black figure data pieces are added to the original image data 200. The original image data 200 including the auxiliary black figure data pieces is stored in a storage part, such as a fixed disk, and updated (step S22). The updated original image data 200 is then input to the RIP part 13 and converted into raster data for image recording. The raster data for image recording indicates the densities of the plurality of colors at each position. The raster data is input to the control part 141 of the inkjet printer 14, and the inkjet printer 14 records an image on the base material 9 in accordance with the input raster data.

Figure 14:
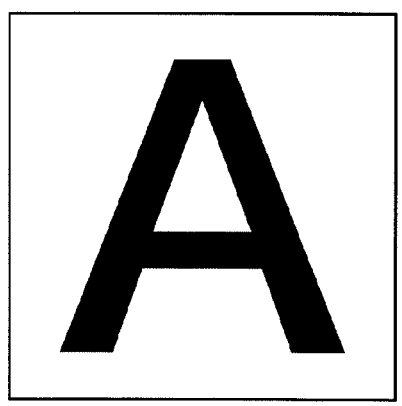
FIG. 14 illustrates a black image indicated by raster data.
Figure 15:
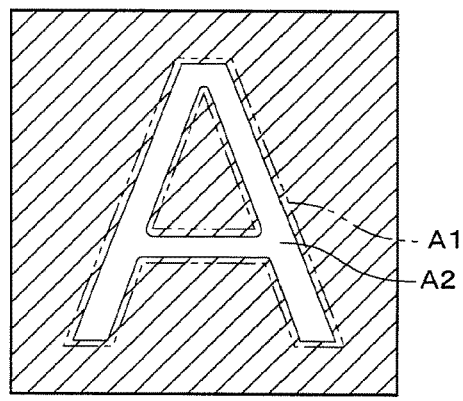
FIG. 15 illustrates another color image indicated by raster data.

FIGS. 14 and 15 illustrate an image indicated by the raster data for image recording acquired from the updated original image data 200. FIG. 14 illustrates part of a black image indicated by the raster data, and FIG. 15 illustrates part of another single color image indicated by the raster data. In FIG. 15, an area A1 of a figure (character) in the black image is indicated by the dashed double-dotted line (the same applies to FIGS. 17 and 19 described later).

Figure 16:
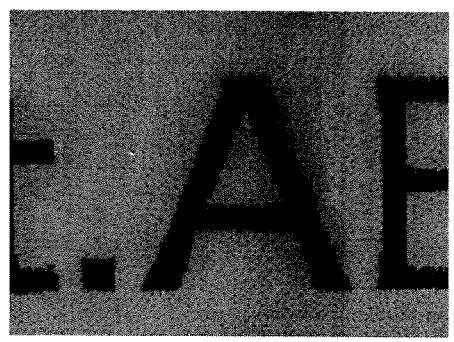
FIG. 16 illustrates an image recorded by an inkjet printer.

As previously described, the updated original image data 200 additionally includes the auxiliary black FIG. 252 that indicates the figure central portion of the black FIG. 251 and whose overprint attribute is OFF. Thus, even if the black FIG. 251 overlaps with another figure that includes a color other than black (here, any of C, M, and Y), i.e., another figure in which the density of another color(s) is greater than 0 (where the black FIG. 251 is arranged over the other figure; the same applies below), the density of the image of the other color (or each of the other colors) indicated by the raster data is zero in an area A2 where the auxiliary black FIG. 252 and the other figure overlap each other. In the image recorded on the base material 9 in accordance with the raster data by the inkjet printer 14, therefore, only black ink exists in the area of the figure central portion (auxiliary black figure) of the black figure, and black ink and the other color (C, M, Y) ink are mixed in only the area of the outer edge portion of the black figure, as illustrated in FIG. 16. Note that in FIG. 16, the component figure data piece 211 that indicates the other figure overlapping with the black figure indicates that a uniform color is used for the other figure as a whole (the same applies to FIGS. 18 and 19 described later).

Figure 17:
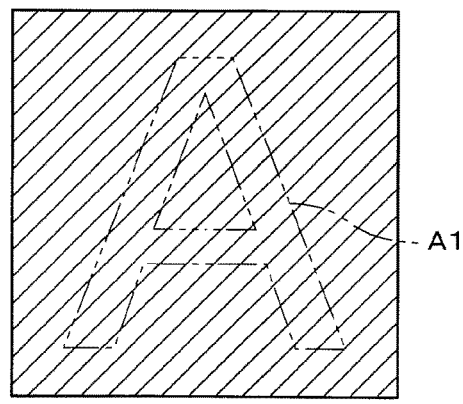
FIG. 17 illustrates another color image indicated by raster data according to comparative processing.

Referring now to processing for converting pre-update original image data 200 into raster data according to a comparative example, when the black FIG. 251 whose overprint attribute is ON overlaps with another figure that includes another color, the image of the other color indicated by the raster data has the same density in the area A1 that overlaps with the black FIG. 251 and in the surrounding area as illustrated in FIG. 17. Thus, as illustrated in FIG. 18, the image recorded on the base material 9 by the inkjet printer 14 is such that black ink and the other color ink are mixed in liquid form in the area of the above overprinted black figure, and accordingly, the color of the black figure cannot be represented purely (the black figure will be an impure black color).

In the comparative processing, when the black FIG. 251 whose overprint attribute is OFF overlaps with another figure that includes another color, the density of the image of the other color indicated by the raster data is zero in the entire area A1 where the black FIG. 251 and the other figure overlap each other, as illustrated in FIG. 19. Thus, if the inkjet printer 14 has a slight shift in ink ejection position relative to the base material 9 between the black head assembly 42 and the other color head assembly 42, white streaks will appear around the area of the above knocked-out black figure in the image recorded on the base material 9, as illustrated in FIG. 20 (see areas indicated by reference numerals B1 in FIG. 20). Note that FIG. 20 reproduces white streaks.

As described above, the data processing apparatus 12 in FIG. 7 specifies a black figure from among a plurality of figures in original image data that represents each of the plurality of figures in a vector format. When the overprint attribute of the black figure is ON, a new black figure that indicates the figure central portion of the black figure and whose overprint attribute is OFF is added to the original image data to update the original image data. Accordingly, when the black figure overlaps with another figure that includes a color other than black, the density of the other color in the area where the figure central portion of the black figure and the other figure overlap is zero in the raster data for image recording. Accordingly, only black ink exists in the figure central portion of the black figure, and black ink and the other color ink are mixed in the outer edge portion of the black figure (which can be regarded as a "trapping process") in the image recorded by the inkjet printer 14 in which a plurality of color inks are easily mixed in liquid form on the base material 9. This consequently increases the darkness (deepness) of color of black figures (that is, the black figures have pure black color) and reduces the appearance of white streaks around the black figures, thus readily improving the quality of the black figures in the recorded image.

In addition, if the overprint attribute of the black figure is OFF, the overprint attribute of the black figure is changed to ON. Then, a new black figure that indicates the figure central portion of the black figure and whose overprint attribute is OFF is added to the original image data to update the original image data. This improves the quality, in the recorded image, of the black figure whose overprint attribute was OFF in the pre-update original image data.

Incidentally, in the case of recording superfine characters or line images, using a raster image processor (RIP) to convert vector data into raster data (i.e., to rasterize vector data) may cause lines to be thickened and indistinguishable. This is due to the fact that outlined characters do not have hint information to be referenced when recording superfine characters, and that pixels relating to characters and figures are determined to be dot formation pixels to prevent each superfine portion from becoming broken during rasterization.

In contrast, the data processing apparatus 12 generates a composed figure in which a thinned figure obtained by thinning one figure among a plurality of figures in the original image data and the central line of the one figure are superimposed on each other, and replaces the one figure with the composed figure. For example, when the one figure is a character, the composed image is generated such that the figure serving as the character is thinned without producing a line break, and the style of the character is substantially maintained. This consequently prevents characters from becoming indistinguishable during rasterization and allows recording of an image close to the original image. Use of the central line also prevents ends of lines from becoming retracted due to the thinning processing. The processing performed by the data processing apparatus 12 can achieve the effect of preventing lines from becoming thickened not only during rasterization but also during image recording. When the composed figure is a black figure, a new black figure (auxiliary black figure) is generated from the composed figure. This improves the quality of the black figure, i.e., the composed figure, in the recorded image.

Depending on the type of the inkjet printer, when a small knocked-out black character is recorded on the base material 9, the shape of the edge of the character (also referred to as a "relief") sometimes appears at a slight distance outward from the edge of the character in the recorded image. In this case, it is preferable to not add an auxiliary black figure, i.e., to record a black figure that is completely overprinted.

Referring, in contrast, to the above-described processing performed by the data processing apparatus 12, even when the overprint attribute of the black figure is OFF, the overprint attribute of the black figure is changed to ON. When the black figure is a fine linear figure such as a small black character and has a line width that is two times or less of the thinning amount for black figures, the auxiliary black figure has a width of zero in step S18 of FIG. 8A and is thus not added. It is thus possible with the above-described processing to more reliably reduce the appearance of relief around small-size black characters and to thereby improve the quality of the black characters in the recorded image.

On the other hand, if the inkjet printer 14 does not produce relief, it is preferable to add an auxiliary black figure in step S18 even if the line width of the black figure is two times or less of the thinning amount for black figures. Specifically, for black characters having a point size of 4 or less (or a point size of 3 or less depending on conditions) as illustrated in FIG. 21A, the widths of auxiliary black figures are zero in step S18. In this case, the central lines of the black characters, which are acquired through the same processing as in step S14, are added as auxiliary black figures. Thus, when the black characters overlap with another figure that includes another color, the density of the image of the other color indicated by the raster data is zero in the area where the image overlaps with the auxiliary black figures (the central lines of the black characters), as illustrated in FIG. 21B.

For black characters having a point size of 10 in FIG. 22A, the auxiliary black figures generated through the processing of step S18 include portions B2 where the width is 0 as illustrated in FIG. 22B. In this case, the auxiliary black figures are preferably combined with the central lines of the black characters to generate final auxiliary black figures. The final auxiliary black figures include part of the central lines of the black characters. Thus, when the black characters overlap with another figure that includes another color, the density of the image of the other color indicated by the raster data is zero in the area where the image and the final auxiliary black figures overlap each other as illustrated in FIG. 22C.

As described above, in the case of using the inkjet printer 14 that does not produce relief, if the size of a black character serving as a black figure is less than or equal to a predetermined size, it is preferable for an auxiliary black figure to include at least part of the central line of the black character. This makes it possible to increase the darkness of color of black characters in the image recorded by the inkjet printer 14.

Figure 23:
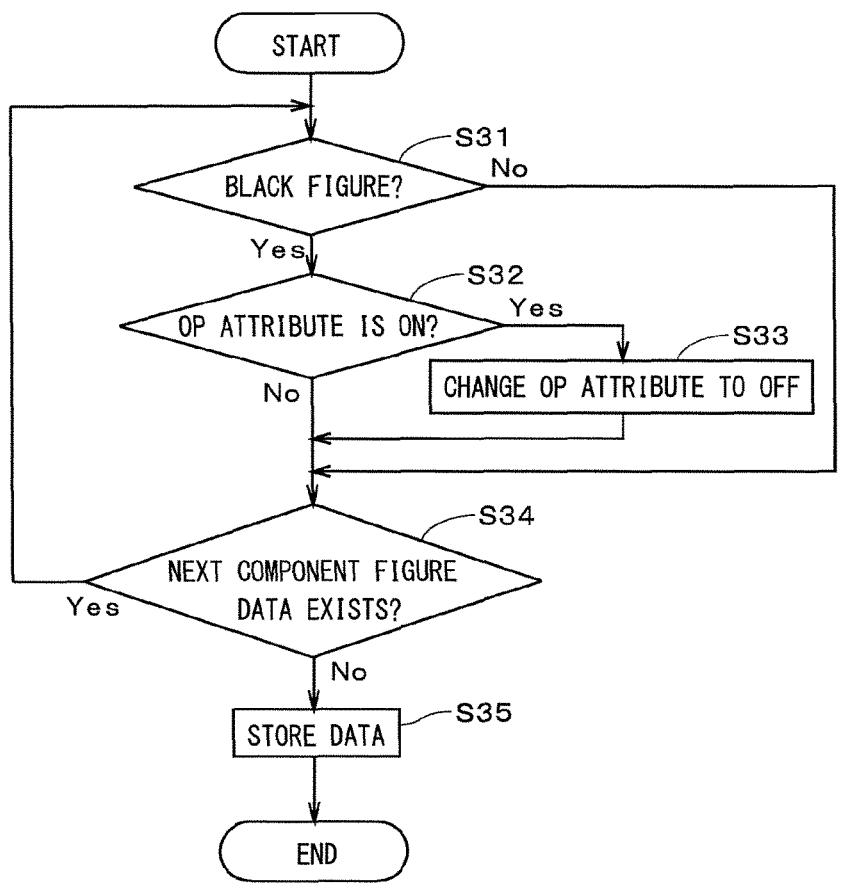
FIG. 23 is a flowchart of operations performed by another data processing apparatus.

Next is a description of operations performed in an image recording system 1 according to a second embodiment of the present invention. FIG. 23 is a flowchart of operations performed by the data processing apparatus 12. The following description omits the generation of a composed figure by the data processing apparatus 12, but it is of course possible to generate a composed figure in the same manner as in the processing of FIG. 8A.

The black figure specification part 302 checks whether or not a component figure indicated by one of the component figure data pieces 211 included in the original image data 200 is a black figure. If the component figure is specified as a black figure (step S31), the data processing part 303 checks whether or not the overprint attribute (OP attribute) of the black figure is ON. If the overprint attribute is ON (step S32), the overprint attribute of the black figure is changed to OFF (step S33).

If the overprint attribute of the black figure is OFF (step S32), the overprint attribute of the black figure is not changed. The above operations of steps S31 to S33 are repeated for all of the component figure data pieces 211 (step S34). At this time, the overprint attributes of component figures other than the black figures are not changed (step S31). Thereafter, the original image data 200 is stored in the storage part and updated (step S35).

The updated original image data 200 is input to the RIP part 13 and converted into raster data for image recording. At this time, the RIP part 13 performs a trapping process (so-called "InRip trapping") on all component figures indicated by the component figure data pieces 211 whose overprint attributes are OFF. In the raster data generated by the trapping process, therefore, when each component figure whose overprint attribute is OFF overlaps with another figure (where the component figure is arranged over the other figure; the same applies below), the density of each color in the area where the figure central portion of the component figure and the other figure overlap each other is the density of this color of the component figure. In the area where the outer edge portion of the component figure, excluding the figure central portion, and the other figure overlap each other, the density of each color has a maximum value among the density of this color of the component figure and the density of this color of the other figure.

As described previously, the overprint attributes of all the black figures in the updated original image data 200 are OFF after the processing of FIG. 23. In the raster data, therefore, the densities of the colors other than black are zero in the figure central portion of every black figure that overlaps with another figure (and that is arranged over the other figure). In the outer edge portion of the black figure, the density of each color has a maximum value among the densities of this color of the black figure and the other figure.

The RIP part 13 does not perform a trapping process on component figures whose overprint attributes are ON. In the generated raster data, therefore, when each component figure whose overprint attribute is ON overlaps with another figure, the density of each color in the area where the two figures overlap each other is the density of this color of the component figure if the density of this color of the component figure is greater than zero, and is the density of this color of the other figure if the density of this color of the component figure is zero (that is, the area is represented in a combination color of the two figures). The raster data for image recording is input to the control part 141 of the inkjet printer 14, and the inkjet printer 14 records an image on the base material 9 in accordance with the raster data.

As described above, in the image recording system 1 according to the second embodiment, the overprint attribute of a black figure included in the original image data is changed to OFF when it is ON. Then, a trapping process is performed when the original image data with the overprint attributes of black figures having been changed is converted into raster data. This increases the darkness of color of the black figures in the image recorded by the inkjet printer 14 and reduces the appearance of white streaks around the black figure, thus readily improving the quality of the black figures in the recorded image.

Depending on the design of the image recording system 1, the above trapping process may be performed by the data processing apparatus 12. In this case, after steps S31 to S34 in FIG. 23 have been completed, processing similar to the above trapping process is performed on the original image data to update the original image data. The updated (post-trapping) original image data is input to the RIP part 13 and converted into raster data (without performing a trapping process). Such a trapping process performed on the original image data can be regarded as part of processing in the RIP part 13 that is performed by the data processing apparatus 12 instead of the RIP part 13. Substantially, this trapping process can be regarded as processing that is performed when the original image data with the overprint attributes of black figures having been updated is converted into raster data.

Various modifications are possible with the above-described image recording system 1.

The process of generating a composed figure in steps S13 to S15 may be omitted from FIG. 8A. In this case, in step S16, the target figure is checked as to whether or not it is a black figure. It is also possible to omit step S19, which is the step of changing the overprint attribute of a black figure to ON when the overprint attribute is OFF, and a trapping process may be performed on black figures whose overprint attributes are OFF, at the time of converting the original image data into raster data.

The above-described embodiments achieve the effect of more reliably increasing the darkness of color of black figures by setting the densities of colors other than black in the areas where the figure central portions of the black figures and other figures overlap each other to zero in the raster data for image recording. Alternatively, for example, the data processing part 303 may change the densities of the other colors in that area to values that are greater than zero and smaller than the original densities of the other figure. In this case as well, it is possible to increase the darkness of color of black figures to some extent in the recorded image and to reduce the appearance of white streaks around the black figures. As described above, what is important is for the data processing part 303 to perform processing on the original image data so that, when the overprint attribute of a black figure is ON and the black figure overlaps with another figure that includes a color other than black (i.e., any of the other colors), the density of the other color in the area where the figure central portion of the black figure and the other figure overlap each other is lower than the original density of the other figure in the raster data for image recording.

In step S14 of FIG. 8A, the central line 245 may be generated only in portions that include positions where the target FIG. 241 is broken due to the thinning processing and in portions that include inwardly retracted ends. In this way, the composed figure generation part 301 acquires at least part of the central line of the target figure. Various methods may be employed to acquire the central line. For example, the central line may be acquired by searching for a vertex that is closest to each vertex and connecting intermediate points between each vertex and its closest vertex. The central line is a line that extends in a longitudinal direction of a linear figure having a width, and does not necessarily have to be a line that exactly indicates the center as long as it approximately indicates the center. The central line may also be a curved line.

It is not absolutely necessary for the original image data 200 to have a structure that includes the layers 210, and the selection of a target figure (specification of a black figure) may be conducted independently of the layers 210. It is, however, noted that the use of the layers 210 facilitates the selection of only a specific area as a target to be processed.

For example, an auxiliary black figure may be displayed on the display part of the data processing apparatus 12 and used to check the processing results. The data processing apparatus 12 may have a RIP function to allow a rasterized image to be displayed and checked.

The inkjet printer 14 may record an image on a base material of a predetermined size, such as cut paper. The ejection unit 3 may move in the Y direction relative to a base material. In other words, a base material and the ejection unit 3 may move relative to each other.

The inkjet printer 14 may use various types of ink other than a UV curing ink. In the case of using a thermal curing ink, for example, the plurality of color inks on each position of the base material 9 are simultaneously cured by a curing part, which is a heater. The inks that permeate into a base material may be used.

The data processing apparatus 12 may be used independently of the image recording system 1.

The configurations of the above-described preferred embodiments and variations may be appropriately combined as long as there are no mutual inconsistencies.

While the invention has been shown and described in detail, the forgoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2014-146048 filed in the Japan Patent Office on Jul. 16, 2014, the entire disclosure of which is incorporated herein by reference.

REFERENCE SIGNS LIST

1 Image recording system
9 Base material
12 Data processing apparatus
13 RIP part
14 Inkjet printer
43 Emitting assembly
81 Recording medium
150 Computer
200 Original image data
211 Component figure data piece
242 Thinned FIG.
245 Central line
246 Composed FIG.
251 Black FIG.
252 Auxiliary black FIG.
253 Outer edge portion
301 Composed figure generation part
302 Black figure specification part
303 Data processing part
810 Program
S11 to S22, S31 to S35 Step

The invention claimed is:

1. A data processing apparatus for performing processing on original image data before the original image data is converted into raster data for image recording performed by an inkjet printer, the apparatus comprising:
 a black figure specification part for specifying a black figure from among a plurality of figures in original image data that represents each of said plurality of figures in a vector format; and
 a data processing part for performing an update of said original image data when an overprint attribute of said black figure is ON and said black figure overlaps with another figure that includes another color other than black, wherein the update includes:
  identifying a figure central portion of said black figure that is a portion excluding an outer edge portion that has a predetermined width from an edge of said black figure, said figure central portion not overlapping with said edge of said black figure, and
  adding a new black figure that corresponds to said figure central portion over said black figure in said original image data, said overprint attribute of said new black figure being set to OFF.

2. The data processing apparatus according to claim 1, wherein
 said data processing part changes said overprint attribute of said black figure to ON when said overprint attribute of said black figure is OFF, and updates said original image data by adding a new black figure that indicates said figure central portion of said black figure and whose overprint attribute is OFF to said original image data.

3. The data processing apparatus according to claim 1, further comprising:
 a composed figure generation part for generating a composed figure in which a thinned figure obtained by thinning one figure among said plurality of figures and at least part of a central line of said one figure are superimposed on each other, and replacing said one figure with said composed figure,
 wherein said data processing part generates said new black figure from said composed figure when said composed figure is said black figure.

4. The data processing apparatus according to claim 3, further comprising:
 a processor; and
 a memory storing instructions that, when executed by said processor, cause said processor to implement said black figure specification part, said data processing part, and said composed figure generation part.

5. The data processing apparatus according to claim 1, wherein
 when a size of a black character serving as said black figure is less than or equal to a predetermined size, said new black figure includes at least part of a central line of said black character.

6. An image recording system comprising:
 the data processing apparatus according to claim 1;
 a RIP part for converting original image data processed by said data processing apparatus into raster data; and
 an inkjet printer for recording an image on a base material in accordance with said raster data.

7. The image recording system according to claim 6, wherein
 in said inkjet printer, a plurality of color inks including black are sequentially ejected onto each position of said base material, and said plurality of color inks at said each position are simultaneously cured by a curing part.

8. The data processing apparatus according to claim 1, further comprising:
 a processor; and
 a memory comprising instructions that, when executed by said processor, cause said processor to implement said black figure specification part and said data processing part.

9. A data processing method for performing processing on original image data before the original image data is converted into raster data for image recording performed by an inkjet printer, the method comprising:
 a) specifying a black figure from among a plurality of figures in original image data that represents each of said plurality of figures in a vector format; and
 b) performing an update of said original image data when an overprint attribute of said black figure is ON and said black figure overlaps with another figure that includes another color other than black,
 wherein the update includes:
  identifying a figure central portion of said black figure that is a portion excluding an outer edge portion that has a predetermined width from an edge of said black figure, said figure central portion not overlapping with said edge of said black figure, and adding a new black figure that corresponds to said figure central portion over said black figure in said original image data, said overprint attribute of said new black figure being set to OFF.

10. The data processing method according to claim 9, wherein in said operation b), said overprint attribute of said black figure is changed to ON when said overprint attribute of said black figure is OFF, and said original image data is updated by adding a new black figure that indicates said figure central portion of said black figure and whose overprint attribute is OFF to said original image data.

11. The data processing method according to claim 9, further comprising:

generating a composed figure in which a thinned figure obtained by thinning one figure among said plurality of figures and at least part of a central line of said one figure are superimposed on each other, and replacing said one figure with said composed figure, wherein in said operation b), said new black figure is generated from said composed figure when said composed figure is said black figure.

12. The data processing method according to claim 9, wherein when a size of a black character serving as said black figure is less than or equal to a predetermined size, said new black figure includes at least part of a central line of said black character.

13. A computer-readable non-transitory recording medium that stores a program for causing a computer to perform processing on original image data before the original image data is converted into raster data for image recording performed by an inkjet printer, said program causing said computer to execute:

specifying a black figure from among a plurality of figures in original image data that represents each of said plurality of figures in a vector format; and performing an update of said original image data when an overprint attribute of said black figure is ON and said black figure overlaps with another figure that includes another color other than black, wherein the update includes:

identifying a figure central portion of said black figure that is a portion excluding an outer edge portion that has a predetermined width from an edge of said black figure, said figure central portion not overlapping with said edge of said black figure, and adding a new black figure that corresponds to said figure central portion over said black figure in said original image data, said overprint attribute of said new black figure being set to OFF.

* * * * *